United States Patent
Batt

(10) Patent No.: US 9,452,784 B2
(45) Date of Patent: Sep. 27, 2016

(54) UNDERBODY ENERGY ABSORPTION DEVICE

(71) Applicant: The Boeing Company, Chicago, IL (US)

(72) Inventor: Edward Batt, Chicago, IL (US)

(73) Assignee: The Boeing Company, Chicago, IL (US)

( * ) Notice: Subject to any disclaimer, the term of this patent is extended or adjusted under 35 U.S.C. 154(b) by 328 days.

(21) Appl. No.: 14/220,897

(22) Filed: Mar. 20, 2014

(65) Prior Publication Data

US 2016/0159401 A1 Jun. 9, 2016

(51) Int. Cl.
*B62D 21/15* (2006.01)
*B60R 21/12* (2006.01)
*F41H 7/04* (2006.01)

(52) U.S. Cl.
CPC .......... *B62D 21/155* (2013.01); *B60R 21/12* (2013.01); *F41H 7/042* (2013.01)

(58) Field of Classification Search
CPC .......... F41H 5/013; F41H 7/04; F41H 7/042; F41H 7/044; F41H 7/02; B60R 21/12; B62D 25/155
USPC .......... 296/187.07, 187.08; 89/36.01, 36.08, 89/36.09
See application file for complete search history.

(56) References Cited

U.S. PATENT DOCUMENTS

| | | | | |
|---|---|---|---|---|
| 7,114,764 B1 * | 10/2006 | Barsoum | ................ | B60R 19/00 296/187.08 |
| 7,997,182 B1 * | 8/2011 | Cox | ................ | B62D 25/2009 296/187.07 |
| 8,146,477 B2 * | 4/2012 | Joynt | ................ | F41H 7/042 296/187.07 |
| 8,616,617 B2 * | 12/2013 | Sherbeck | ................ | 296/187.07 |
| 8,627,757 B2 * | 1/2014 | Tobie | ................ | F41H 5/007 89/36.04 |
| 8,740,286 B2 * | 6/2014 | Aizik | ................ | F41H 7/042 296/187.07 |
| 8,899,652 B2 * | 12/2014 | Brill | ................ | F41H 7/042 296/187.07 |
| 8,967,699 B1 * | 3/2015 | Richmond | ................ | F41H 7/044 296/187.07 |
| 9,097,492 B2 * | 8/2015 | Parida | ................ | F41H 7/042 |
| 2009/0140545 A1 * | 6/2009 | Greuter | ................ | F41H 7/042 296/187.07 |
| 2010/0037761 A1 * | 2/2010 | Boczek | ................ | F41H 7/044 89/36.08 |
| 2010/0307329 A1 * | 12/2010 | Kaswen | ................ | F16F 9/06 89/36.08 |
| 2011/0017054 A1 * | 1/2011 | Naroditsky | ................ | F41H 7/042 89/36.02 |
| 2012/0174767 A1 * | 7/2012 | Naroditsky | ................ | F41H 7/042 89/36.08 |
| 2012/0186436 A1 * | 7/2012 | Parida | ................ | F16F 9/30 89/36.08 |
| 2012/0210861 A1 * | 8/2012 | Tobie | ................ | F41H 5/007 89/36.04 |
| 2013/0220108 A1 * | 8/2013 | Oriet | ................ | F41H 7/042 89/36.08 |
| 2014/0130658 A1 * | 5/2014 | Gonzalez | ................ | F41H 7/042 89/36.08 |
| 2014/0311330 A1 * | 10/2014 | Parida | ................ | F41H 7/042 89/36.08 |
| 2014/0318359 A1 * | 10/2014 | Asaf | ................ | F41H 5/007 89/36.08 |

* cited by examiner

*Primary Examiner* — Gregory Blankenship
(74) *Attorney, Agent, or Firm* — McDonnell Boehnen Hulbert & Berghoff LLP

(57) ABSTRACT

A blast shield for underbody protection of vehicles is presented that combines energy absorption and deflection in order to provide occupant protection and increased survivability in the event of an underbody explosive blast, especially those caused by improvised explosive devices. Absorption of blast energy is accomplished by a dampening system comprising a plurality of spaced hydraulic dampers position on a hull that deflects forces outward from underneath the vehicle.

19 Claims, 5 Drawing Sheets

UNDERBODY ENERGY ABSORPTION DEVICE

TECHNICAL FIELD

This invention relates to an energy absorption device for installation under the body of a vehicle to protect the vehicle and occupants from explosive forces caused by the detonation of a bomb, such as an improvised explosive device (IED). Hydraulic dampers combined with a blast deflecting-shaped hull absorb and redirect blast energy absorb away from the vehicle.

BACKGROUND

Improvised explosive devices (IEDs) may be bombs fabricated in an improvised manner from other explosive devices, such as an artillery shell. These devices may incorporate explosive materials, as well as fragmentation materials. IEDs may be remote controlled and/or triggered by infrared detectors, pressure bars, trip wires, and/or other suitable devices. Mines may be explosive devices placed on or in the ground. When in the ground, these mines may be referred to as land mines. These types of mines may be triggered by an operator and/or by the proximity of a vehicle, person, animal, and/or some other suitable object. The term IED may be inclusive of both improvised explosive devices as well as land mines.

IEDs may target the underside of conventional ground vehicles and armored vehicles. Various counter-measures may be employed to reduce and/or eliminate threats from IEDs. Some counter-measures include electronic jamming devices that may prevent the ignition of remotely controlled IEDs. These electronic counter-measures, however, may be ineffective against IEDs that use trip wires or other non-wireless trigger mechanisms, such as pressure switches used in land mines. Chemical detection may in some cases be successful in locating an IED. Although these and other counter measures may be useful in preventing the triggering of IEDs and/or detecting IEDs, these explosive devices may still detonate regardless of the precautions in place.

As a result, structures may be employed on the underside of vehicles to protect against pressures and forces generated when an IED explodes. These structures may take the form of blast plates. These blast plates can in some cases mitigate the effects of the explosive pressure and/or fragments to the occupants of a vehicle. These blast plates may be fabricated using armor similar to that used on the sides of armored personnel carriers and tanks. Likewise, it is known to design the plate with a V-shape in an attempt to redirect explosive forces outward and away from the underside of the vehicle.

Another problem is that extra weight reduces the fuel efficiency of a vehicle and increases operating costs. Further, the weight may increase the strain on other components of the vehicle resulting in more maintenance being performed. The weight of the blast plates also may reduce the acceleration, maneuverability, and/or performance of the vehicle during travel. V plates with steep V shapes can greatly reduce the ground clearance of the vehicle, thus diminishing vehicle performance. As such, it would be advantageous to have a shallow V shape that performs as well as a steep V design while preserving as much of the original vehicle ground clearance as possible.

Therefore, it would be advantageous to have a device that takes into account one or more of these issues, as well as possibly other issues.

SUMMARY

The present invention combines energy absorption and deflection in order to provide ground vehicle occupant protection and increased survivability in the event of an underbody explosive blast, especially those caused by improvised explosive devices (IEDs). Energy adsorption is accomplished by the use of one or more dampening systems in combination with an energy deflecting V-shaped hull design. The blast shield of this invention can be installed on the underbody of a ground vehicle, for example, a Humvee.

One advantageous embodiment of the present invention is a blast shield comprising a blast resistant panel, for example armor plating, having a left side edge, a right side edge, a front end, a rear end, a top surface and a bottom surface. An beam having a top and a bottom is connected to the top surface of the panel to form a V-shaped hull, preferably using a bolted connection and without using welds. A pair of dampers is positioned adjacent to and on either side of the beam with each damper having a bottom portion and a top portion. The bottom portion of the damper is in contact with the top surface of the panel and the top portion is adjacent to a channel cap connected to the top of the beam. The panel may also comprise two or more panels connected together without the use of welds to form the preferred V-shaped hull configuration. A preferred beam construction is one that has a cross-section in the shape of an "I," sometimes referred to as an "I-beam," however, beams having a different cross-section can be used.

Yet another advantageous embodiment of the present invention comprises a blast shield that uses a V-shaped hull fabricated with only bolted and braced connections and no welds. The absence of welds allows each of the materials of construction to retain its full inherent mechanical strength. A dampening system is positioned mechanically in series between the armor plate and the support structure that defines the V-shaped hull. The rigid armor plate or plates deflect the blast energy while the dampening system simultaneously absorbs this energy by taking advantage of the inertia differential between the blast shield acting on one side and the vehicle weight acting on the opposite side, thus creating the required displacement in the dampers to absorb the blast energy.

Another advantageous embodiment comprises a modular design with a fully bolted construction that allows ease of integration into retrofit kits for legacy vehicles and also can be integrated into clean sheet design for ground combat vehicles. This modular design includes the use of surface or connection bars that allow the blast shield to be fastened to the frame of the vehicle. The surface bars also provide rigid longitudinal support for the blast shield and are positioned along the right and left side edges of the panel. A crushable and compressible energy absorbing material can be sandwiched between the top surface of the panel and the bottom of the surface bar. Additionally, this deformable material can be used between truss ribs and the top surface of the panels and between end caps and the beam located on the centerline of the blast panel.

Another advantageous feature of the present invention is that the dampening system can be tuned for a desired energy absorption taking into account the specifics of the vehicle and the expected types of IEDs. Tuning can be achieved by changing the configuration of the internal components of the dampers, including, for example, changing the number adjustable orifices, the orifice size, or the type of working fluid. The use of the dampening system is believed advantageous because blast energy will first be absorbed by the dampening system before absorption by the armor blast plates.

Yet another advantageous embodiment of the blast shield of this invention includes the use of a plurality of truss ribs connected to the top surfaces of the panel and positioned to define a plurality of channels extending outward from the beam. Preferably, the channels house the dampening system of the present invention, where each channel can hold a damper contained between two adjacent ribs and covered by a channel cap, where the channel cap is connected to two adjacent truss ribs. The channel caps can be attached, preferably by screws or bolts, to the top of the beam.

Another advantageous embodiment includes a dampening system comprising a plurality of hydraulic dampers having a slidable piston within a reservoir, where the reservoir is filled with a working fluid, preferably a viscous fluid, for example, grease. A hollow cylinder portion of the damper defines the reservoir within the cylinder wall. The top portion of the damper preferably comprises a deformable shock absorbing material that in a first state will securely contact the damper to the channel cap and in a second state will fragment and collapse in response to a blast event. The bottom portion of the damper can be wedged shaped and comprise the same or different deformable shock absorbing material used to form the top portion. The damper piston has one or more orifices to allow the working fluid to flow out of the reservoir when the cylinder and piston slide relative to each other. The piston can also be hollow defining a lower reservoir having a moveable seal that can be biased by a compression spring configured to keep the working fluid trapped within the lower reservoir and to allow the dampers to be filled with the working fluid. The orifices also allow the dampers to be bled to remove trapped air. The spring can be configured with enough compression force to return the movable seal to a starting position after compression.

In yet another advantageous embodiment the blast shield comprises two end caps, one end cap is connected to the front end of the blast panel and the other end cap is connected to the rear end of the panel, where a deformable material is disposed between each end cap and the beam.

Another advantageous embodiment of the present invention is the inclusion of a second dampening system where a second plurality of dampers are used to absorb blast energy that causes the side edges of the panel to pull inward towards the beam during an explosive evident. As the blast forces are directed upwards against the bottom side of the blast panel the panel is deformed into a so-called "gull wing" shape where the top surface on either side of the beam deflects upwards towards the vehicle causing each side of the panel to pull inwards toward the beam. To diminish the effect of this retraction of the side edges, the panel can include a longitudinal slot or opening along each edge. Further, each surface bar can include one or more downwardly extending lugs that project into openings or slots located intermittingly along the panel edges. A plurality of hydraulic dampers can be positioned in these slots and in contact with the lugs such that the dampers absorb the forces causing the inward movement of the panel edges These dampers can be the same or similar in design to the dampers described above.

The present invention also includes a method of protecting the occupants of a vehicle from a blast event by providing a shield having one or more blast resistant panels connected to a beam where the top surface of the panel has opposing connection points, preferably along each side edge, for attaching the shield to the vehicle, preferably to the underneath of the vehicle and most preferably to the vehicle frame. The panel is connected to the panel to form a hull that directs blast forces away from the vehicle. A dampening system is coupled to the top surface of the panel(s) preferably such that at least a pair of dampers is positioned adjacent to and on either side of the beam. During a blast event the shield transforms from a pre-blast event state to a post-blast event state. This transformation caused to distance between the opposing connection points to move closer together. Stated differently, the opposing connection points are closer together in the post-blast state of the shield as compared to the pre-blast state. The method also results in one or more dampers moving from an uncompressed state to a compressed state when the shield transforms from a pre-blast event state to a post-blast event state.

The features, functions, and advantages that have been discussed can be achieved independently in various embodiments or may be combined in yet other embodiments further details of which can be seen with reference to the following description and drawings.

BRIEF DESCRIPTION OF THE FIGURES

The present invention will become more fully understood from the more detailed description presented below and the accompanying drawings which are presented by way of illustration only, and thus, are not limitations of the present invention, and wherein.

Corresponding parts are marked with the same reference symbols in all figures.

DETAILED DESCRIPTION

Figure 1:
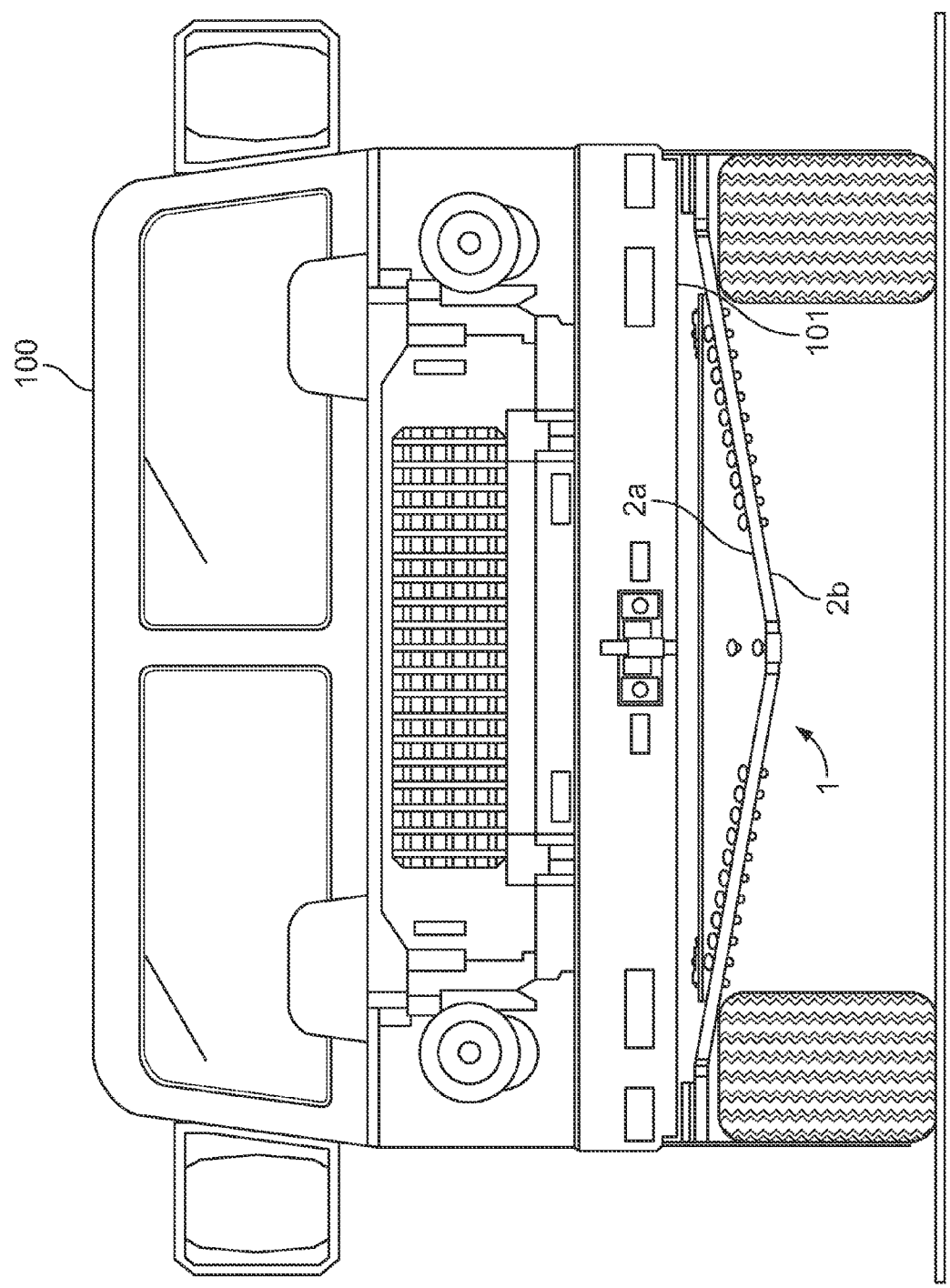
FIG. 1 illustrates one possible advantageous embodiment of the present invention attached to the underbody of a ground vehicle.

Referring now to the drawings illustrating possible embodiments of the present invention, FIG. 1 shows a blast shield 1 of the present invention connected to the underbody 101 of a ground vehicle 100. Preferably, the blast shield system is bolted directly to the vehicle frame.

Ground vehicle 100 may take various forms, for example, without limitation, it may be a high mobility multi-purpose ground vehicle, a tank, an armored personnel carrier, a car, a truck, or some other suitable type of ground vehicle. Although a ground vehicle is shown, different advantageous embodiments may be applied to other vehicles, such as winged or rotor aircraft, naval vehicles, or even prefabricated temporary buildings.

Figure 2:
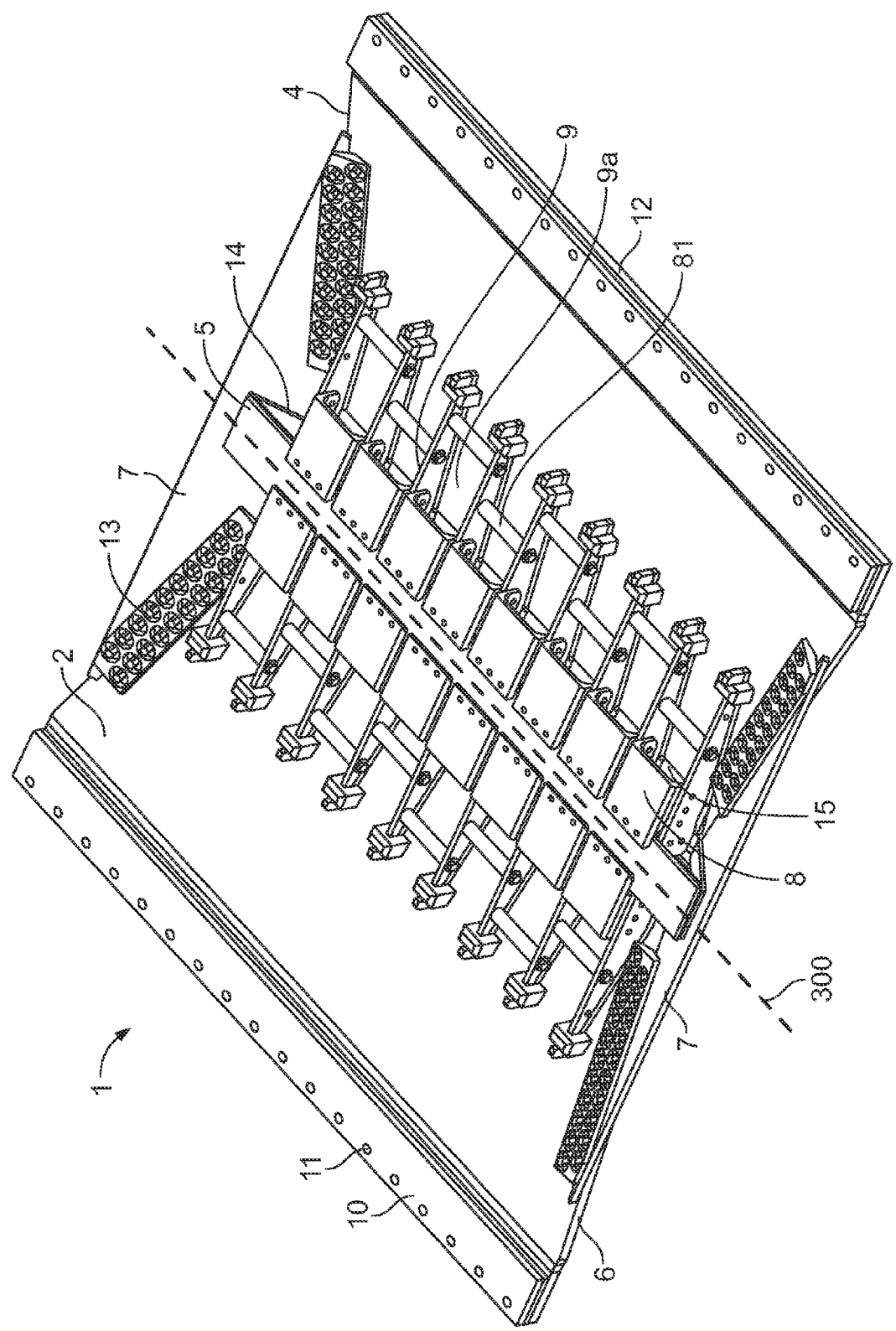
FIG. 2 schematically illustrates a perspective view of one advantageous embodiment of the blast shield of the present invention.

FIG. 2 illustrates blast shield 1 as viewed from the top or looking downward from the vehicle underbody to which it is configured for attachment. A close-up cross sectional view of shield 1 is presented in FIG. 3. A blast plate or panel 2 is shown connected to beam 5, illustrated as an I-beam, through connections 3, preferably using bolts, screws, or other removable connectors. As alternative to the I-beam illustrated, beam 5 can have a different shape and cross-section, for example a hat-shaped beam, or can be any other structural support member that provides multiple attachment points for one or more panels 2. Preferably, welded connections are not used in order to preserve the mechanical strength properties of the panel and to allow for a modular construction design. Panel 2 is preferably a single sheet of blast proof armor and may be comprised of any material suitable for deflecting and/or absorbing blast energy. For example, without limitation, blast panel 2 may be comprised of a metallic material, aluminum, titanium, steel, a steel alloy, a ceramic material, a composite material, and/or some other suitable material. The panel may have multiple layers of these mentioned materials, a single layer of a selected material, and/or some other suitable configuration. When a single panel is used it preferably has a non-planar shape design to direct blast forces outwardly away from the centerline of the panel where beam 5 is preferably connected.

Panel 2 and beam 5 are connected through connectors 3 to form a V-shaped hull where the right and left sides of the panel project upwardly at angle Θ, which preferably is less than 90 degrees and more preferably in the range of from about 10 degrees to about 20 degrees upwardly from horizontal. (see FIG. 2). In alternative embodiments of the present invention the right and left sides may comprise individual panels that are joined together through connection to I-beam 5. Attached to the front and rear ends of panel 2 are end caps 7 connected through connectors 13. Truss ribs 9 are connected to panel 2 through connector lugs 11 and can be interconnected to each other through cross supports 33. Ribs 9 extend outwardly from beam 5 and are positioned in adjacent rows transverse to the beam 5 and the centerline 300, preferably forming an approximate right angle with respect to the centerline, although the ribs may form non-right angles with respect to the centerline and still perform their intended function. Each pair of adjacent ribs forms a channel 9*a*. Channels 9*a* are partially covered with a channel cap 8 that is connected to the top of beam and to the adjacent ribs. The ribs are preferably fabricated to match the shape of panel 3, preferably having angled bottom edges 9*b* matching angle Θ.

Each side edge of panel 2 has connecting or surface bars 10 that allow blast shield 1 to connect through connectors 11 to the underbody 101 of vehicle 100. Positioned between surface bars 10 and the edge of panel 2 is a destructible and deformable material 12. The same or like deformable material 12 and 14 can also be positioned between the bottom edge 9*b* of ribs 9 and the top surface 2*a* and between end caps 7 and beam 5, respectively. The destructible and deformable material can be selected from a group of materials that will crush in a blast event allowing displacement of the components on either side of the material, which also allows displacement of a dampener system. The dampening system comprises a plurality of dampers 30 that are configured to absorb additional blast energy at the same time as the deformable material. Preferably, the deformable material is stiff enough to allow rigid attachment of the armor structure to the vehicle, but soft or yielding enough to allow inertia to move the V-shaped hull relative to the center structure during a blast event. Suitable deformable materials could include polyurethanes, aluminum foam, or combinations of these or like materials.

Figure 3:
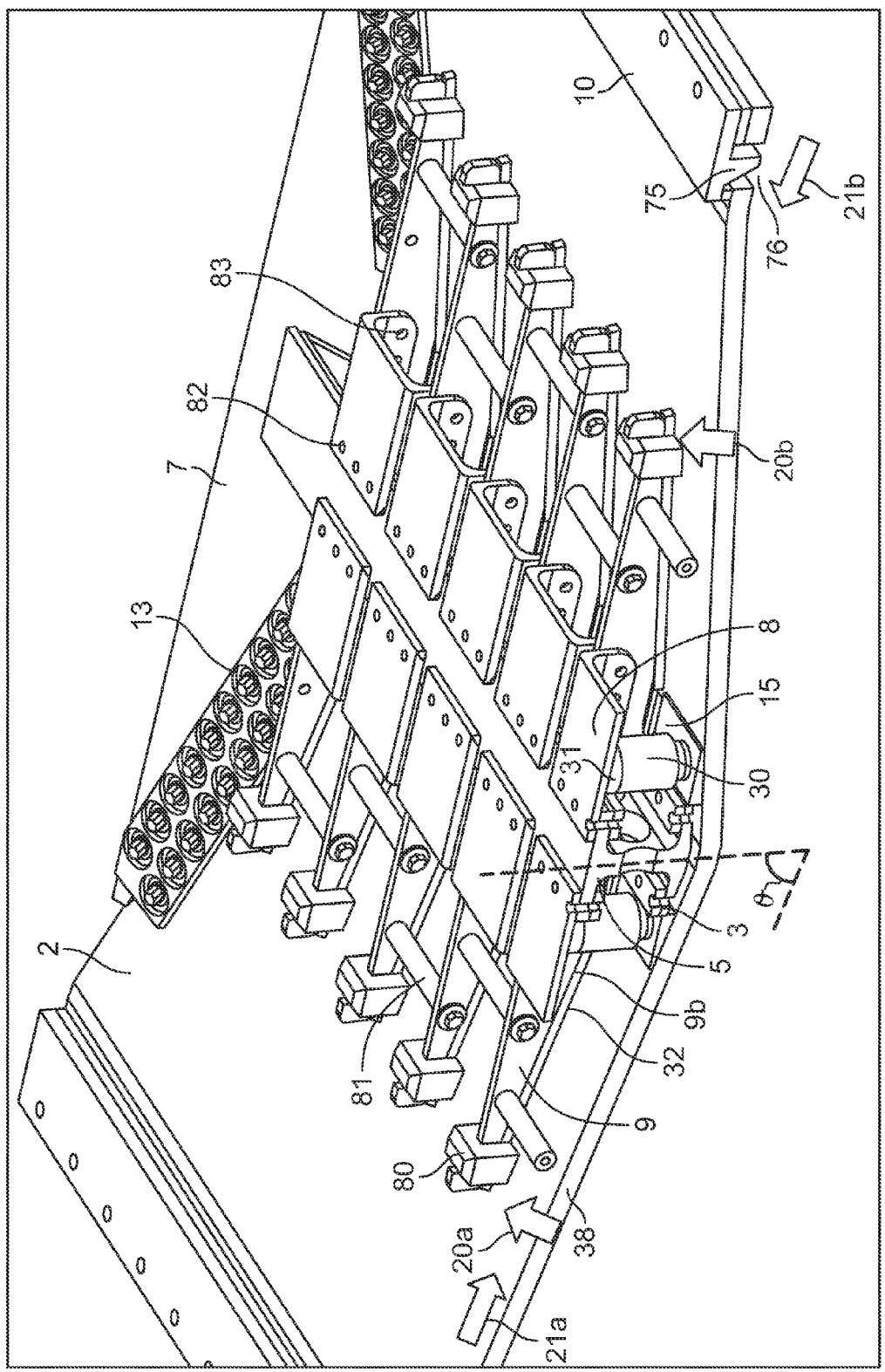
FIG. 3 presents a close up partial perspective view of the advantageous embodiment of the blast shield illustrated in FIG. 2.
Figure 5:
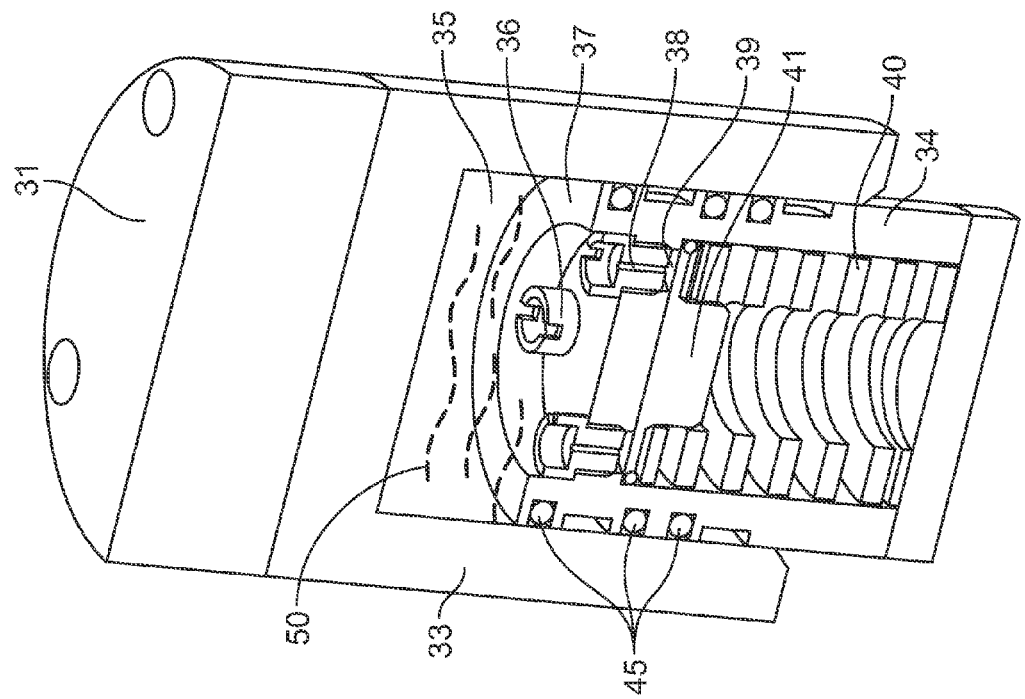
FIG. 5 illustrates a cross-sectional perspective view of one embodiment of the damper of the present invention.
Figure 4:
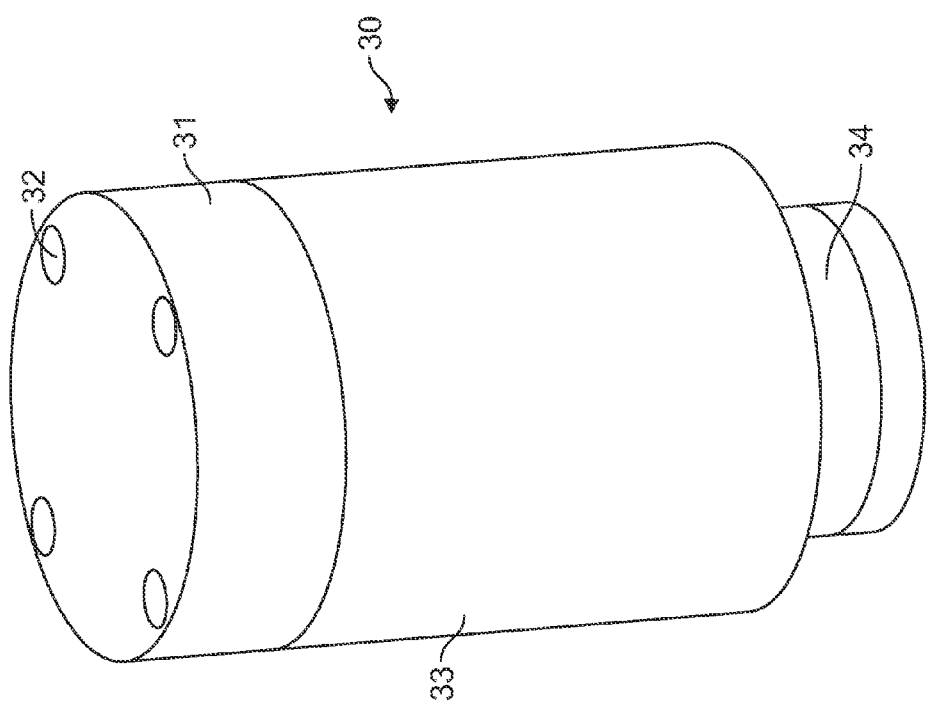
FIG. 4 illustrates a perspective view of one embodiment of the damper of the present invention.

The dampening system of the present invention can comprise two separate systems. On system comprising a plurality of dampers 30 located in the channels 9*a* formed by adjacent ribs 9 and located underneath channel caps 8. The second dampening system, as discussed in more detail below, comprises a plurality of dampers 60 positioned in a slot 36 on the side edges of panel 2. FIG. 3 shows a pair of dampers 30 arranged adjacent to beam 5 and positioned on either side of the beam. Multiple dampers can be positioned along the length of the centerline 300, preferably having a damper in each channel 9*a* and on each side of the beam 5. FIGS. 4 and 5 illustrate a preferred damper design. Piston 34 is slidable within cylinder 33. The top portion 32 of the damper is a cushion, preferably comprising a soft material, such as plastic, that isolates the rigid cylinder 33 from extreme shock loads, e.g., a metal on metal contact during a blast event. Although the exemplified dampers described here and shown in the figures are hydraulic dampers, other damper designs could be used, for example, those based on one or more springs, compressible materials, frangible materials, or designs that may incorporate a combination of such materials with hydraulic and/or spring features.

FIG. 5 shows the internals of a preferred damper design. A reservoir 35 is defined by the upper surface of the cylinder 33, the cylinder walls and top surface 37 of piston 34. Grease or other viscous working fluid 50 is contained in reservoir 35. The top 37 of piston 34 may have one or more adjustable orifices 36 having orifice channels 38. The adjustable orifices can allow the working fluid to flow from the reservoir 35 to a lower reservoir 39 upon compression of damper 30 during a blast event. This restricted flow of the working fluid provides the energy absorbing dampening effect of the dampening systems of the present invention. The adjustable orifices 36 can be configured to allow the dampening system to be tuned during the manufacturing process to allow the blast shield 1 to be used for different structures on different vehicles. Seals 45, for example, piston rings, allow piston 34 to slide relative to cylinder 33 while preventing the working fluid 50 from leaking out of reservoir 35. A return spring 40 can be used in conjunction with bladder umbrella seal 41 to trap any of the working fluid passing through orifices 36. This combination of spring and bladder seal can allow the dampers to be filled and bled and/or to return the working fluid into reservoir 35 after compression.

In a preferred arrangement, each dampener 30 is provided with a bottom portion 15 made of the same cushion material as the top portion 31 or of the deformable material 32. The bottom portion can be directly connected to the dampener 30 or be a separate component that is position on the top surface 2*a* of panel 2 directly under the damper 30. In ether case it is preferred that the bottom portion 15 is wedge shaped matching angle Θ. This allows the damper to be positioned vertically plum relative to the horizontal.

Referring again to FIGS. 2 and 3, during an explosive event that occurs underneath the blast shield 1, blast energy is directed upward against the bottom surface 2*b* of panel 2 causing the right and left sides of the panel to bow or deflect upwards in the direction shown by arrows 20*a* and 20*b*. This deflection of the panel causes a gull wing shape because the rigid beam 5 resists upward movement. As the right and left portions of panel 2 move upwards, the sides of the panel are simultaneously pulled inwards towards the centerline 300 in the direction shown by arrows 21*a* and 21*b*. To minimize the effect of this inward pulling and the strain placed on connecting bars 10 and underbody 101, a second dampening system can be used.

Figure 6:
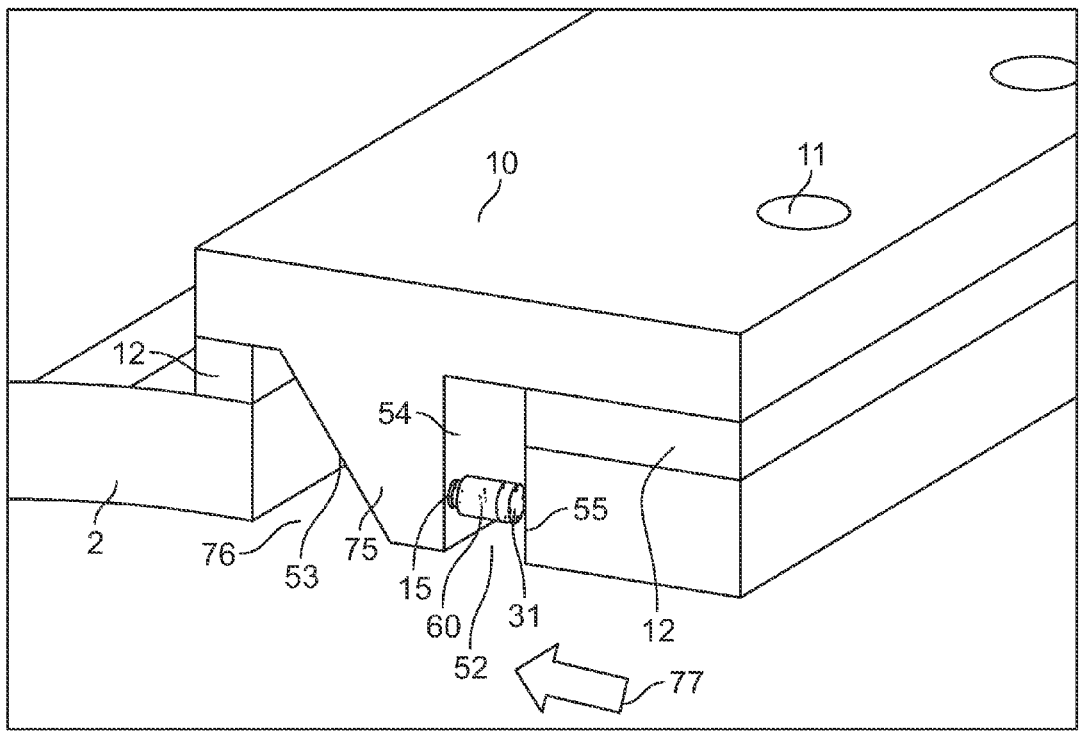
FIG. 6 illustrates a close-up perspective of a side edge of one possible embodiment of the present invention using a second dampening system.
Figure 7:
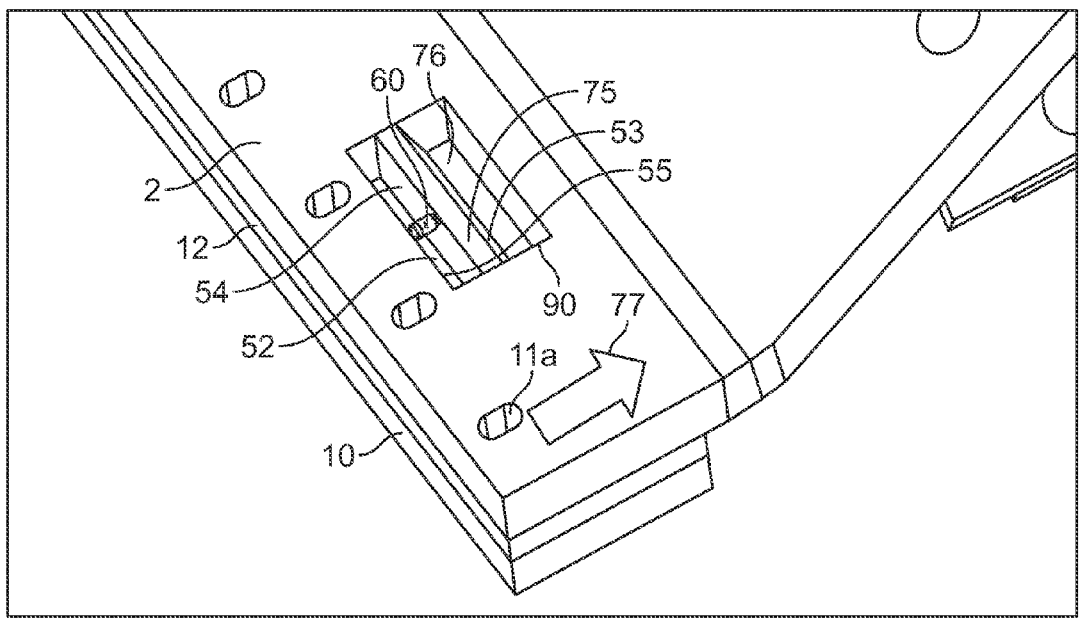
FIG. 7 illustrates a close-up perspective of a side edge of one possible embodiment of the present invention using a second dampening system viewed from the bottom of the blast shield.

The optional second dampening system is shown in FIGS. 6 and 7 where one side edge of panel 2 is shown having a slot or opening 76. FIG. 7 shows a view from looking up from the ground at the bottom side of panel 2. One of a plurality of cut outs 90 in the blast panel is shown along with a plurality of connection points or holes 11a that are shaped to allow lateral movement of the blast shield in the direction of arrow 77 relative to the vehicle body and connectors 11. Surface bar 10 has a lug 75 extending downward into slot 36 of cut out 90 and has an inner wall 54 and outer wall 53 that is tapered to provide support for the second dampening system. The optional second dampening system can comprise a plurality of dampers 60 that are positioned in space 52 formed between inner wall 54 and wall 55 of panel 2. As panel 2 is pulled in the direction shown by arrow 77 during a blast event the dampers 60 will compress as space 52 decreases and will absorb and dampen the blast energy. Dampers 60 are preferably of the same design as those described above for dampers 30.

The foregoing description of the specific embodiments will so fully reveal the general nature of the invention that others can, by applying current knowledge, readily modify and/or adapt for various application such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

The invention claimed is:

1. A shield for use on the bottom of a vehicle to protect occupants of the vehicle comprising,
    a) a panel having a left side edge, a right side edge, a front end, a rear end, a top surface and a bottom surface;
    b) a beam connected to the panel to form a hull;
    c) a dampening system comprising a pair of dampers positioned adjacent to and on either side of the beam with each damper coupled to the panel
    a plurality of truss ribs connected to the top surface of the panel and positioned to define one or more channels extending outward from the beam; and
    wherein the dampers are positioned in the channels and covered by channel caps.

2. The shield of claim 1, wherein the channel caps are connected to two adjacent truss ribs.

3. The shield of claim 1 further comprising a deformable material positioned between the truss ribs and the top surface of the panel.

4. The shield of claim 1 where the right side edge and the left side edge of the panel are connected to surface bars configured to allow connection of the shield to a vehicle frame.

5. The shield of claim 4 further comprising a deformable material positioned between the surface bars and the top surface of the panel.

6. The shield of claim 1 where the dampers comprise a slidable piston within a reservoir, where the reservoir is filled with a working fluid.

7. The shield of claim 6 where the working fluid is grease.

8. The shield of claim 1 where a top portion of the dampers comprise a deformable shock absorbing material.

9. The shield of claim 1 where a bottom portion of the dampers is wedged shaped and comprises a deformable shock absorbing material.

10. The shield of claim 1 further comprising two end caps, one end cap connected to the front end of the panel and the other end cap connected to the rear end of the panel, where a deformable material is disposed between each end cap and the beam.

11. The shield of claim 1 further characterized in that the panel comprises two or more separate panels connected to the beam without welds.

12. The shield of claim 3 further characterized in that each surface bar has a downwardly extending lug positioned in a slot in the panel, where the slot is located below the surface bar and is configured to accept the lug.

13. The shield of claim 12 where a damper is positioned in the slot and in contact with the lug.

14. The shield of claim 1 where connections made to the panel are not welds.

15. The shield of claim 6 where the piston is hollow and comprises a return spring and a lower reservoir defined by a slidable seal.

16. The shield of claim 1 where the hull is V-shaped.

17. A shield for use underneath a vehicle to protect occupants of the vehicle comprising,
    a) a panel having a top surface;
    b) a beam secured without welding to the panel to form a V-shaped hull, where the panel has sides with each side having a slot configured to accept a downwardly extending lug of a surface bar configured for connection to a vehicle frame;
    c) a plurality of truss ribs connected to the top surface of the panel and extending outwardly from the beam at spaced intervals, where adjacent truss ribs define a channel;
    d) channel caps connected to adjacent truss ribs and the beam;
    e) a first dampening system comprising a plurality of first dampers positioned in the channels adjacent the beam;
    f) a second dampening system comprising a plurality of second dampers positioned in the slot and in contact with the lug; and
    g) deformable material positioned,
        i) between the truss ribs and the top surface of the panel; and
        ii) between the surface bars and the top surface of the panel.

18. A method of protecting occupants of a vehicle from a blast event comprising,
    a) providing a shield having,
        i) a blast resistant panel having a top surface and opposing connection points for attaching the shield to a vehicle ;
        ii) a beam connected to the panel to form a hull; and
        iii) a dampening system coupled to the top surface of the panel comprising a pair of dampers positioned adjacent to and on either side of the beam;
    b) connecting the shield to a vehicle,
    wherein the shield transforms from a pre-blast event state to a post-blast event state where the connection points are closer together than when the shield is in the pre-blast event state.

19. The method of claim 18 where one or more dampers move from an uncompressed state to a compressed state when the shield transforms from a pre-blast event state to a post-blast event state.

* * * * *